United States Patent [19]
Kasai

[11] Patent Number: 5,897,385
[45] Date of Patent: Apr. 27, 1999

[54] ELECTRICAL CONNECTION BOX FOR USE IN A CAR

[75] Inventor: Koji Kasai, Yokkaichi, Japan

[73] Assignee: Sumitomo Wiring Systems, Ltd.,, Yokkaichi, Japan

[21] Appl. No.: 08/890,423

[22] Filed: Jul. 9, 1997

[30] Foreign Application Priority Data

Jul. 9, 1996 [JP] Japan ................................. 8-179392

[51] Int. Cl.⁶ .................................................. H01R 9/09
[52] U.S. Cl. .......................................... 439/76.2; 439/949
[58] Field of Search .................... 439/76.2, 949, 439/638, 596

[56] References Cited

U.S. PATENT DOCUMENTS 5,190,475  3/1993  Dickens ................................. 439/596
5,295,858  3/1994  Kasai et al. .............................. 439/949
5,403,193  4/1995  Ito et al. ................................. 439/76.2

FOREIGN PATENT DOCUMENTS 5-22829  1/1993  Japan .

*Primary Examiner*—Steven L. Stephan
*Assistant Examiner*—T. C. Patel
*Attorney, Agent, or Firm*—Oliff & Berridge, PLC

[57] ABSTRACT

An electrical connection box for use in a vehicle, e.g. a car, has a junction box and a circuit addition box removably mounted on the junction box and having a connector engaging portion for engagement in use by a connector of an external circuit. The circuit addition box has bus bars connecting circuit components of the junction box to the connector engaging portion to provide electrical connection to the external circuit. To achieve a compact arrangement, avoiding the need to adapt the junction box, the circuit addition box is removably mounted on a relay housing of the junction box adapted to receive a relay, the relay housing having electrical terminals engaged by the bus bars of the circuit addition box.

2 Claims, 5 Drawing Sheets

ELECTRICAL CONNECTION BOX FOR USE IN A CAR

BACKGROUND OF THE INVENTION

1. Field of Invention

The present invention relates generally to an electrical connection box for use in a vehicle, e.g., a car. More particularly, this invention relates to an electrical connection box for use in a car that permits easy alteration of the construction of an existing internal circuit of a junction box and addition of a circuit to the existing internal circuit without changing the construction of the existing internal circuit of the junction box.

2. Description of Related Art

The same junction box as is used currently in one type of car is often applied to new cars which are to be manufactured by slightly changing the features of the original type of box. In adding a new system to an existing electrical system, it becomes necessary to take off a further power circuit from a circuit installed inside the junction box. In this case, the following two methods have hitherto been adopted.

In the first method, the construction of an internal circuit comprising a bus bar and installed inside the junction box is altered. In the second method, electrical wires of a circuit connected with the junction box are branched outside the junction box.

In the first method, in most cases, it is impossible to alter the internal circuit of the junction box because the junction box is designed with high density of its components. Even if space permits the alteration of the internal circuit, it may be necessary to add a bus bar to the existing internal circuit and alter the configuration of the junction box, which leads to a high manufacturing cost.

In the second method, it is necessary to increase the number of electrical wires of a wire harness in accordance with the added circuit and hence the diameter of the wire harness becomes larger, which makes it more difficult to wire the wire harness in a car body. That is, the wire harness cannot be inserted into a through-hole formed on the car body and interferes with other component parts. In addition, some electrical wires of the wire harness are required to be long, which leads to a higher manufacturing cost.

In order to solve the above-described problem, the assignees of the present inventor proposed a junction box that is disclosed in JP-A-5-22829 and corresponding U.S. Pat. No. 5,403,193 and shown in FIGS. 7A and 7B of the present application. This compact junction box 4 comprises a power source receiving/supplying socket 1, a power source supply connector 2 and an optional connection socket 3. The compact junction box 4 is removably connected to a power source receiving/supplying socket 6 of a junction box body 5 using the power source supply connector 2.

In this junction box, the addition of a system can be accomplished because it can be installed on the junction box body 5 without increasing the number of electrical wires of the wire harness. However, it is necessary to provide the junction box body 5 with the power source receiving/supplying socket 6 dedicated to an optional circuit, which makes the junction box body 5 large. Further, because the junction box 4 is provided with the power receiving/supplying socket 1 and the power source supply connector 2, the proposed junction box is comparatively large. Therefore, a considerable amount of space is required and hence, the compact junction box 4 cannot be installed on the junction box body 5 in many cases.

SUMMARY OF THE INVENTION

The present invention seeks to avoid or reduce the above-described problems. Accordingly, it is an object of the present invention to provide an electrical connection box for use in a car permitting easy alteration or addition of a circuit without providing a junction box with a socket which is used exclusively for a circuit alteration and/or addition and without altering an internal circuit of the junction box.

In order to solve the above-described problems, the present invention provides a circuit addition box removably mounted on a relay housing of a junction box. The circuit addition box comprises a relay housing engaging portion and an external connector engaging portion and accommodates a pair of bus bars, one end of each of the bus bars being inserted into the relay housing engaging portion and the other end of each of the bus bars being inserted into the external connector engaging portion in such a manner that one end of each of the bus bars is connected with an internal circuit of the junction box at a power source side thereof and the other end of each of the bus bars is connectable with an external circuit through an external connector.

In operation, typically a plurality of relay housings are mounted on the junction box. Positive and negative terminals connected with a power circuit are provided on each of the relay housings. The relay housings and the positive and negative terminals are utilized to connect a circuit (to be added) to the power circuit. That is to say, the circuit addition box is mounted on an unused relay housing, one end of each of the bus bars accommodated in the circuit addition box is connected with an internal terminal of the relay housing, and the other end of each of the bus bars projects into the connector engaging portion formed on the circuit addition box to connect the bus bars with the external circuit. This construction allows a circuit to be added to the existing internal circuit of the junction box without altering it.

In particular, the circuit addition box comprises the relay engaging portion provided at one side thereof and the connector engaging portion provided at the other side thereof so as to efficiently accommodate the bus bars therebetween. Thus, the electrical connection box for use in a car has a simple construction and is compact, thus not occupying a large space. The circuit addition box preferably does not interface with the fitting of components onto an adjacent relay housing or housings of the junction box. A fuse or fuses for the added circuit may be provided in the junction box.

Preferably, the circuit addition box comprises first and a second box portions locked to each other, the first box portion and the relay housing are locked to each other, with the first box providing the relay housing engaging portion and the second box portion comprising the electrical connector engaging portion. In this construction, after the bus bars are accommodated in the first box, the first box is covered by the second box to sandwich the bus bars between the first box and the second box, with the bus bars projecting into the electrical connector engaging portion.

One end of each of the bus bars accommodated inside the circuit addition box is inserted into the relay housing, and the other end of each of the bus bars is projected into the connector engaging portion. Thus, the intermediate part of each of the bus bars is held. Further, the circuit addition box is provided with the portion engaging the relay housing and the portion engaging a connector. In order to meet these requirements and allow the circuit addition box to have a compact and simple construction, the circuit addition box is divided into the first and second box portions, and the bus bars are sandwiched in the connection between the first and second box portions.

Preferably, the circuit addition box comprises the first box portion, the second box portion, and a hinge interposed therebetween, all formed in one-piece by monolithic molding of a plastics material. It is possible to form the first box portion and the second box portion separately from each other and cover the first box portion with the second box portion and lock them to each other, after the bus bars are accommodated in the first box portion. But the first and second box portions formed by monolithic molding of a plastics material allows a small number of parts to be used and assembling operation to be easily accomplished.

With reference to a horizontal base of the junction box, preferably each of the bus bars accommodated in the circuit addition box comprises a bent metal element having a vertical first portion providing an internal circuit connection terminal inserted into a relay terminal insertion opening formed on the relay housing, a horizontal second portion adjoining the internal circuit connection terminal and continuous herewith, and a third vertical portion providing the external circuit connection terminal adjoining the continuous portion and continuous therewith, thus projecting into the connector engaging portion. In this construction, the second horizontal portion is sandwiched between the first and second box portions.

BRIEF DESCRIPTION OF THE DRAWINGS

These and other optional features of the present invention will become clear from the following description of preferred embodiments thereof given with reference to the accompanying drawings throughout which like parts are designated by like reference numerals, and in which.

DETAILED DESCRIPTION OF PREFERRED EMBODIMENTS

Figure 1:
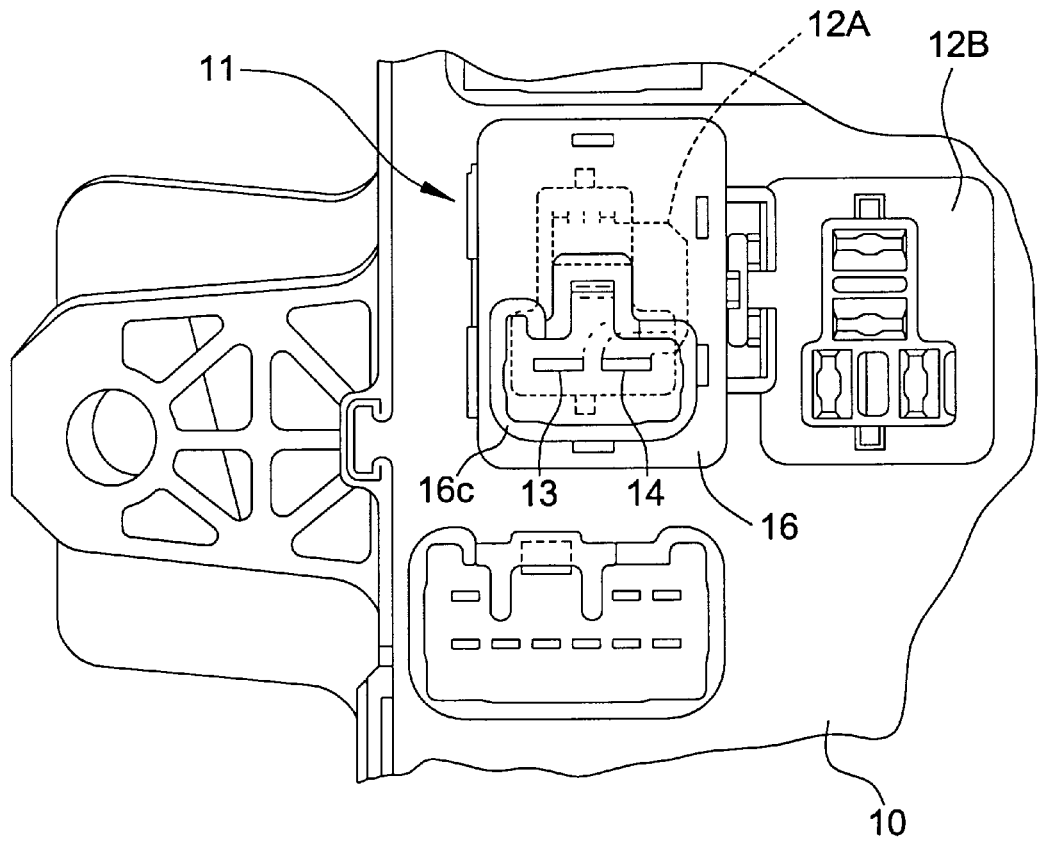
FIG. 1 is a plan view of an electrical connection box for use in a car, embodying the present invention.
Figure 2:
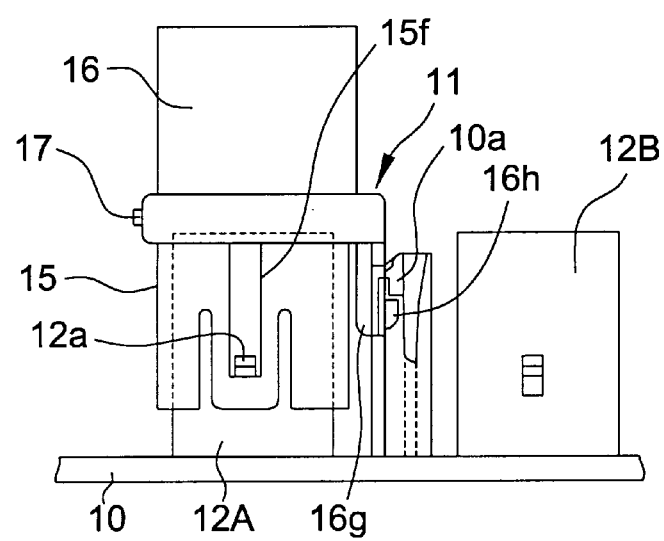
FIG. 2 is front view of main portions of the electrical connection box shown in FIG. 1.

An electrical connection box, for use in a car, of the present invention is described below with reference to FIGS. 1 to 6. FIG. 1 shows a junction box 10 and a circuit addition box 11. When it is desired to add a circuit to an existing circuit due to the addition of a system to an existing system, the circuit addition box 11 is installed on an unused relay housing 12A which is one of a plurality of relay housings 12A, 12B, etc. mounted on the upper surface of the junction box 10.

The relay housing 12A is adapted to be used for a micro ISO relay. Thus, a portion of the circuit addition box 11 to be mounted on the relay housing 12A has a shape similar to that of the micro ISO relay, and the position of a pair of bus bars 13 and 14 of the circuit addition box is such that the ends of the bus bars 13 and 14 to be inserted into the relay housing 12A are coincident with the terminals of the micro ISO relay. The bus bars 13 and 14 are accommodated in the circuit addition box 11.

Figure 3A:
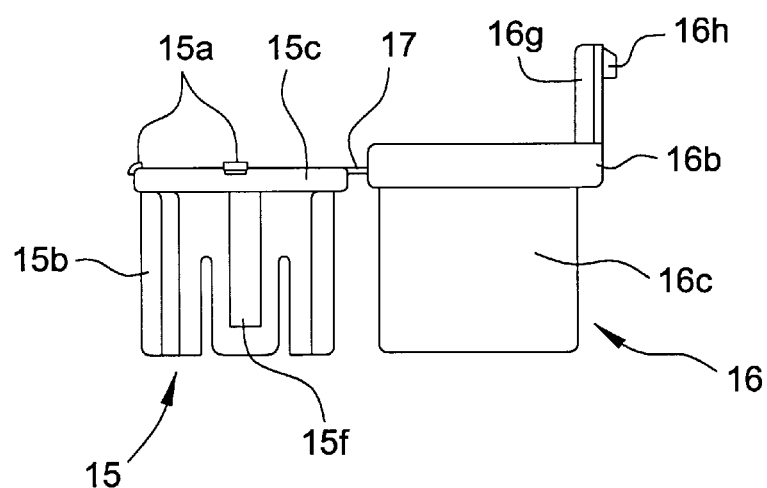
FIG. 3A is a front view showing a state in which first and second boxes of a circuit addition box of the connection box shown in FIG. 1 are opened.
Figure 3B:
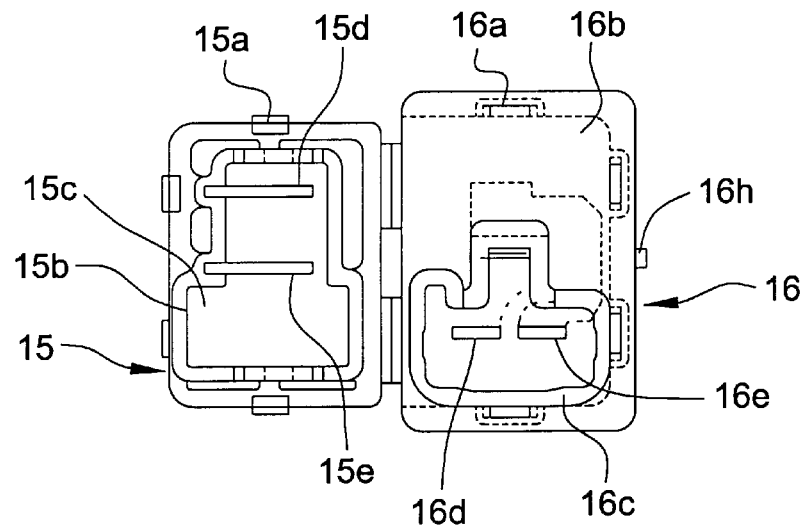
FIG. 3B is a plan view showing the state in which the first and second boxes shown in FIG. 3A are opened.
Figure 3C:
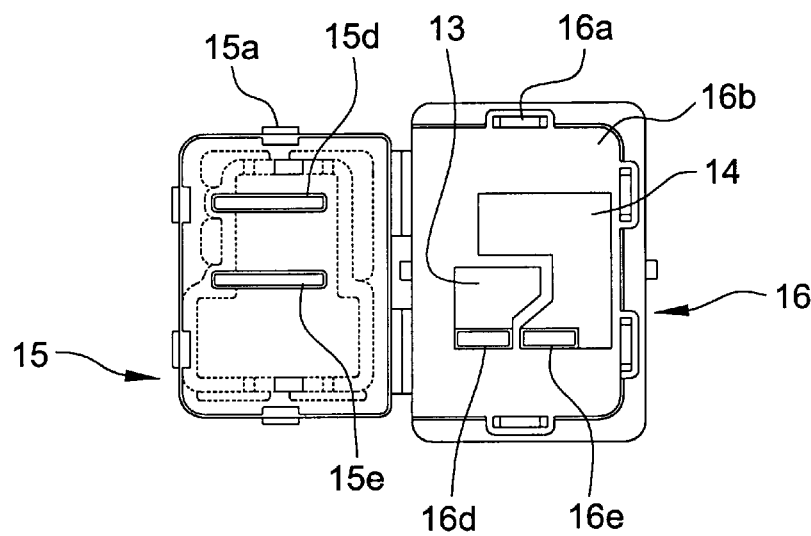
FIG. 3C is a bottom view showing the state in which the first and second boxes shown in FIG. 3A are opened.
Figure 4A:
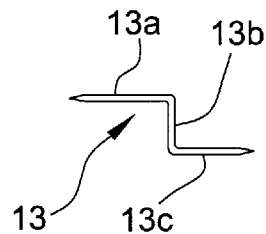
FIG. 4A is a side view showing a bus bar which is accommodated in the circuit addition box of FIGS. 3A–3C.
Figure 4B:
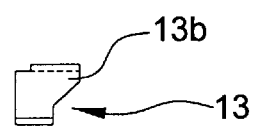
FIG. 4B is a plan view of the bus bar shown in FIG. 4A.
Figure 4C:
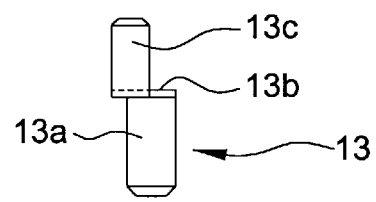
FIG. 4C is front view of the bus bar shown in FIG. 4A.
Figure 5A:
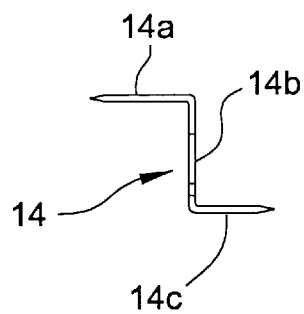
FIG. 5A is a side view of another bus bar which is accommodated in the circuit addition box of FIGS. 3A–3C.
Figure 5B:
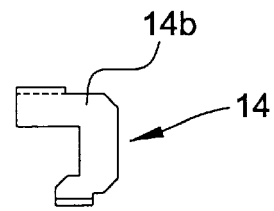
FIG. 5B is a plan view of the bus bar shown in FIG. 5A.
Figure 5C:
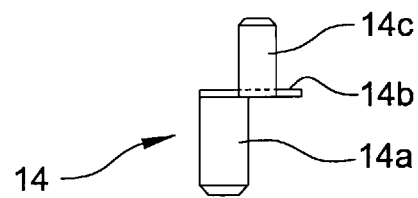
FIG. 5C is front view of the bus bar shown in FIG. 5A.

Referring to FIGS. 3A, 3B, and 3C, by monolithic molding, a suitable plastics material is formed into the circuit addition box 11 comprising a first box 15, a second box 16, and a thin living hinge 17 connecting the first and second boxes 15 and 16. The first box 15 and the second box 16 are locked to each other as follows: after the bus bars 13 and 14 are accommodated in the first box 15, the first box 15 is covered by the second box 16 by mutual pivoting at the hinge 17. Then, a locking claw 15a formed on the peripheral wall of the first box 15 is locked to a locking hole 16a formed on the second box 16.

Figure 6:
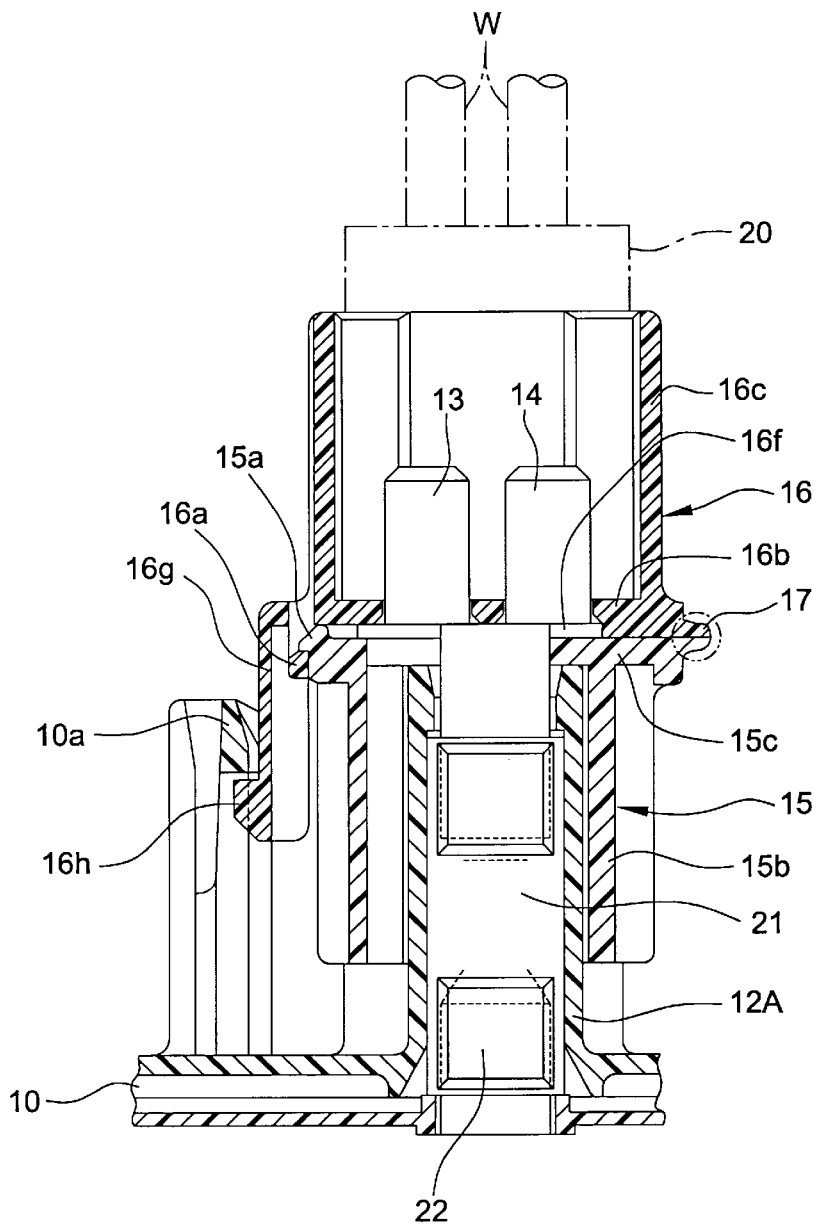
FIG. 6 is a sectional view showing a state in which the circuit addition box of FIGS. 3A–C is mounted on a relay housing of a junction box.
Figure 6A:
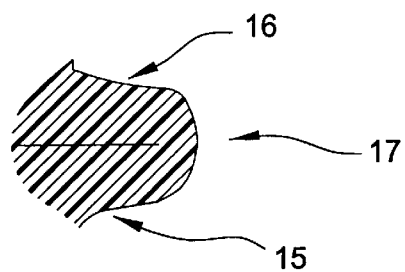
FIG. 6A is a blown-up detail view of the circuit addition box of FIG. 6.
Figure 7A:
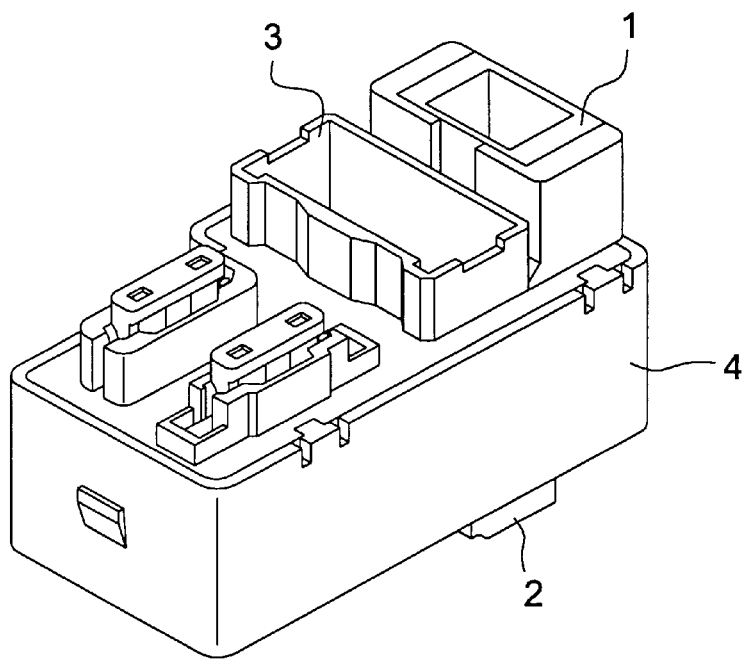
FIG. 7A is a perspective view showing a prior art junction box.
Figure 7B:
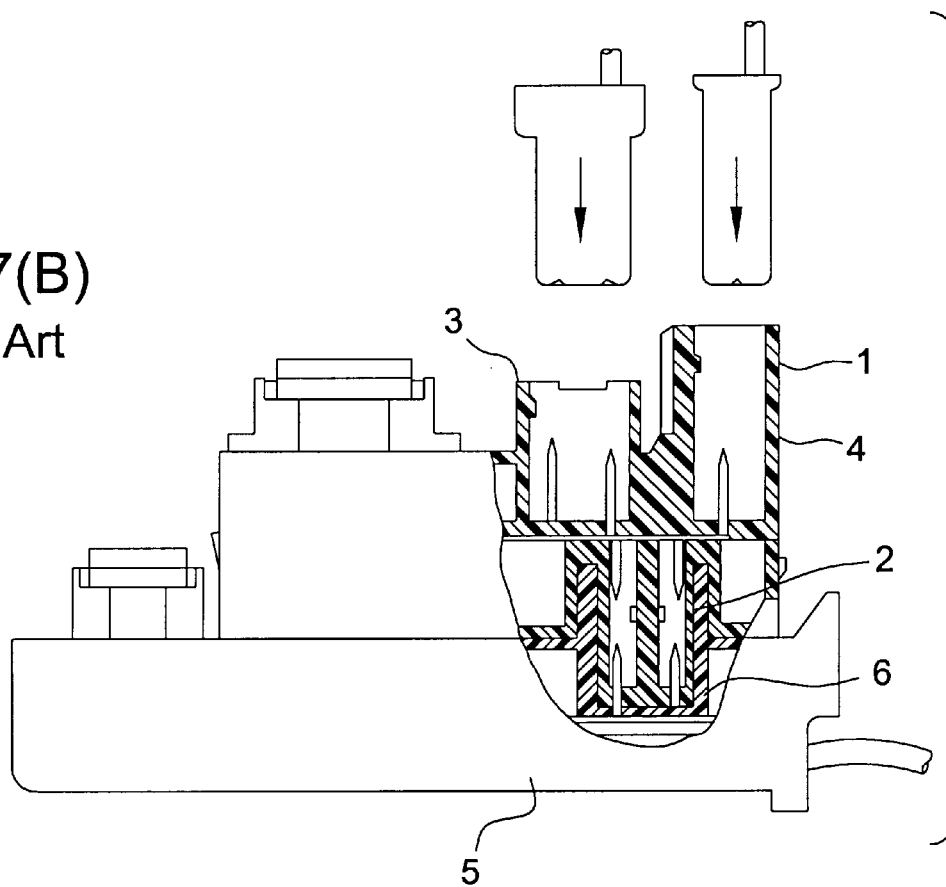
FIG. 7B is a front view partly in section showing a state in which the prior art compact junction box of FIG. 7A is connected with the body of another junction box.

Referring to FIGS. 2, 3A, 3B, and 3C, the construction of the first box 15 is described. The first box 15 has an upright rectangular hollow portion 15b which is fitted on the relay housing 12A standing up on the upper surface of the junction box 10. Bus bar insertion holes 15d and 15e are formed on an upper wall 15c of the cylindrical portion 15b. As described above, one side of the upper wall 15c is connected with the second box 16 through the thin hinge 17 (FIGS. 6 and 6A). The hollow portion 15b has a locking groove 15f formed thereon. A locking claw 12a projecting from the peripheral wall of the relay housing 12A is locked to the locking groove 15f.

In this construction, the circuit addition box 11 is supported on the junction box 10 solely by the relay housing 12A. The circuit addition box is very compact and does not extend much beyond the relay housing 12A, as seen in plan view. Also, the circuit addition box does not interfere with the fitting of another component on the adjacent relay housing 12B. Its lower part comprises the box portion 15 which closely surrounds the relay housing 12A.

The construction of the second box 16 is now described. When the first box 15 is covered with the second box 16, a bottom wall 16b of the second box 16 is connected with the upper wall 15c of the first box 15, with the bottom wall 16b located on the upper wall 15c. A connector engaging portion 16c projects from one side of the bottom wall 16b. Bus bar insertion holes 16d and 16e are formed on the bottom surface of the connector engaging portion 16c.

Referring to FIG. 6, a recess 16f formed on the bottom wall 16b accommodates the horizontal middle portions of the bus bars 13 and 14, with the bus bars 13 and 14 sandwiched between the upper wall 15c of the first box 15 and the bottom wall 16b. A locking strip 16g projects from the peripheral wall of the bottom wall 16b at the side opposite to the side thereof connected with the hinge 17. A locking claw 16h formed at the leading end of the locking strip 16g engages a locking claw 10a formed on the junction box 10.

The bus bars 13 and 14 that are accommodated in the recess 16f formed on the bottom wall 16b of the second box 16 have a configuration shown in FIGS. 4A–C and 5A–C, respectively. That is, the bus bar 13 is a bent metal element and comprises a vertical internal circuit connection terminal 13a which is inserted into a relay terminal insertion opening formed on the relay housing 12A, a horizontal continuous middle portion 13b bent from the internal circuit connection terminal 13a and continuous therewith, and a vertical external circuit connection terminal 13c bent from the continuous portion 13b and continuous therewith, thus projecting into the connector engaging portion 16c. Similarly, the bus bar 14 comprises a vertical internal circuit connection terminal 14a which is inserted into the relay terminal insertion opening formed on the relay housing 12A, a horizontal continuous portion 14b bent from the internal circuit connection terminal 14a and continuous therewith, and a vertical external circuit connection terminal 14c bent from the continuous portion 14b and continuous therewith, thus projecting into the connector engaging portion 16c. The horizontal continuous middle portions 13b and 14b are accommodated in the recess 16f (see FIG. 6) of the bottom wall 16b, with the continuous portions 13b and 14b sandwiched between the upper wall 15c of the first box 15 and the bottom wall 16b of the second box 16.

In order to connect a general-purpose external connector 20 shown in chain-dot lines in FIG. 6 with the connector engaging portion 16c of the second box 16, the connector 20 with its external electrical wires W is inserted into the connector engaging portion 16c into which the external circuit connection terminals 13c and 14c of each of the bus bars 13 and 14 project. A terminal-accommodating chamber of the connector 20 accommodates female terminals (not shown in FIG. 6) connected with the wires W by compression. When the connector engaging portion 16c engages the connector 20, the female terminals engage the tab-shaped external circuit connection terminals 13c and 14c of each of the bus bars 13 and 14c. In this manner, the circuit addition box 11 and the external connector 20 are electrically connected with each other.

Referring to FIG. 6, through a relay terminal 21, the tab-shaped internal circuit connection terminals 13a and 14a inserted into the relay terminal insertion opening of the relay housing 12A are electrically connected with a pair of tabs 22 projecting from bus bars of the internal circuit of the junction box 10. Because one of the tabs 22 is connected with the relay terminal 21, it is always connected with a power circuit. Thus, when one of the tabs 22 is connected with the bus bar 13 accommodated inside the circuit addition box 11 through the relay terminal 21, the bus bar 13 is supplied with an electrical power.

Using the electrical connection box for use in a car having the above-described construction, a new circuit can be added to the existing internal circuit of the junction box 10 by merely mounting the circuit addition box 11 on the unused relay housing 12A of the junction box 10 when a new system is desired to be added to the existing system. When adding the new circuit, it is unnecessary to alter the construction of the existing internal circuit of the junction box 10.

That is, after the bus bars 13 and 14 are inserted into the first box 15 of the circuit addition box 11, the locking claw 15a of the first box 15 is locked to the locking hole 16a of the second box 16, with the first box 15 covered with the second box 16. Then, the locking claw 12a of the relay housing 12A is locked to the locking groove 15f of the first box 15. Then, the locking claw 16h of the locking strip 16g engages the locking claw 10a of the junction box 10. In this manner, the power circuit can be connected with the added circuit. Thereafter, the connector 20 connected with the external electrical wire is inserted into the connector engaging portion 16c of the circuit addition box 11 to connect the connector 20 to the second box 16. In this manner, the added system is supplied with an electrical power from the junction box 10 through the electrical wires W.

The present invention is not limited to the above-described embodiment. For example, the relay housing 12A on which the circuit addition box 11 is installed is not limited to the one which is used for a micro ISO relay, but a circuit addition box may be installed on any relay housings provided on the junction box 10.

As apparent from the foregoing description, when the alteration or addition of a circuit is desired because of the addition of a system, the electrical connection box for use in a car having the above-described construction allows the power circuit to be connected with the added circuit not by altering the construction of the existing internal circuit inside the junction box, but by merely mounting the circuit addition box on the unused relay housing of the junction box.

Further, the added circuit can be added to the existing internal circuit of the junction box, thus avoiding using an electrical wire for connecting the added circuit with a remote power source. Thus, it is unnecessary to increase the diameter of a wire harness. Therefore, the wire harness can be reliably wired in a car body. In addition, it may be unnecessary to prepare long electrical wires, which can avoid the increase in manufacturing cost.

Although preferred embodiments of the present invention have been described with reference to the accompanying drawings, it is to be noted that various changes and modifications are apparent to those skilled in the art and are to be understood as included within the scope of the present invention.

What is claimed is:

1. An electrical connection box for use in a vehicle, comprising:

(i) a junction box having internal circuit components constituting a power source for electrical circuits connected thereto;

(ii) at least one relay housing mounted in said junction box and adapted to receive a relay and having electrical terminal members connected to said internal circuit components of said junction box; and (iii) a circuit addition box removably mounted to surround said relay housing and having a first connection portion engaging said relay housing and a second connection portion adapted to engage an external connector, said circuit addition box accommodating a pair of bus bars indirectly connected to the power source of the junction box, each of the bus bars having a continuous central portion transverse to and connecting offset first and second ends of each of the bus bars, said respective first ends of said bus bars engaging said terminal members of said relay housing and said respective second ends of the bus bars constituting electrical terminals in said second connection portion of said circuit addition box, whereby when an external connector is engaged with said second connection portion of said circuit addition box, said bus bars provide an electrical connection thereto from said internal circuit components of said junction box, wherein said circuit addition box comprises a first box portion and a second box portion locked to said first box portion, said first box portion providing said first connection portion and being removably locked in position on said relay housing and said second box portion providing said second connection portion, the continuous central portion of said bus bars being held in place in said circuit addition box by being sandwiched between said first and second box portions and projecting into said second box portion to provide said electrical terminals therein.

2. An electrical connection box according to claim 1, wherein said first and second box portions of said circuit addition box are connected together by a hinge whereby they are mutually pivotable prior to their locking together, said first and second box portions and said hinge being monolithically molded as one piece of plastics material.

* * * * *